(12) United States Patent
Hu

(10) Patent No.: US 9,930,521 B2
(45) Date of Patent: Mar. 27, 2018

(54) METHOD FOR UPDATING PREFERRED ROAMING LIST OF UIM CARD

(71) Applicant: Intel Corporation, Santa Clara, CA (US)

(72) Inventor: Jun Hu, Hangzhou (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/183,907

(22) Filed: Jun. 16, 2016

(65) Prior Publication Data
US 2017/0013444 A1 Jan. 12, 2017

(30) Foreign Application Priority Data
Jul. 9, 2015 (CN) .......................... 2015 1 0400940

(51) Int. Cl.
H04W 8/20 (2009.01)
H04W 4/14 (2009.01)

(52) U.S. Cl.
CPC ............ H04W 8/205 (2013.01); H04W 4/14 (2013.01)

(58) Field of Classification Search
CPC ............................... H04W 8/205; H04W 4/14
USPC ......................................................... 455/558
See application file for complete search history.

(56) References Cited

U.S. PATENT DOCUMENTS

| | | | |
|---|---|---|---|
| 5,978,677 A * | 11/1999 | Sawyer .................. | H04W 8/12 455/432.1 |
| 6,564,055 B1 * | 5/2003 | Hronek .................. | H04W 48/18 455/418 |
| 6,681,111 B2 * | 1/2004 | Ahn ...................... | H04W 8/04 455/432.1 |
| 6,718,263 B1 * | 4/2004 | Glass .................... | G07B 15/02 455/428 |
| 6,996,398 B1 * | 2/2006 | Powell .................. | H04W 8/245 370/338 |
| 7,089,001 B2 * | 8/2006 | Leung ................... | H04W 48/18 455/432.1 |
| 7,139,570 B2 * | 11/2006 | Elkarat .................. | H04W 8/06 455/432.1 |
| 7,209,736 B2 * | 4/2007 | Link, II ................. | H04W 4/14 455/419 |
| 7,333,808 B2 * | 2/2008 | Elkarat .................. | H04W 8/06 455/422.1 |
| 7,353,023 B1 * | 4/2008 | Link, II ................. | H04W 4/14 455/414.2 |
| 7,433,929 B2 * | 10/2008 | Guilford ............... | H04W 48/18 455/435.2 |

(Continued)

FOREIGN PATENT DOCUMENTS

CN 1211376 A 3/1999
EP 1189473 A2 3/2002

OTHER PUBLICATIONS

Office Action dated Dec. 4, 2017 for Chinese Patent Application No. 201510400940.4 (with English translation).

*Primary Examiner* — Hai V Nguyen
(74) *Attorney, Agent, or Firm* — Schiff Hardin LLP

(57) ABSTRACT

Provided is a method for updating a preferred roaming list of a user identity module card, the method comprising: reading preferred roaming list updating data; packing the preferred roaming list updating data in a preferred roaming list updating text message; and writing the preferred roaming list updating text message into a text message file of a user identity module card.

5 Claims, 1 Drawing Sheet

(56) References Cited

U.S. PATENT DOCUMENTS

| | | | | |
|---|---|---|---|---|
| 7,505,756 B2 * | 3/2009 | Bahl | | H04W 12/06 370/331 |
| 7,570,944 B2 | 8/2009 | Dunlop et al. | | |
| 8,023,942 B2 * | 9/2011 | Kumar | | H04W 8/06 455/433 |
| 8,081,992 B2 * | 12/2011 | Book | | H04M 1/575 370/310.2 |
| 8,190,198 B1 * | 5/2012 | Venkataramu | | H04L 63/0853 370/320 |
| 8,213,989 B2 * | 7/2012 | Jheng | | H04W 8/26 455/432.1 |
| 8,238,905 B2 * | 8/2012 | Jiang | | H04M 3/2281 455/432.1 |
| 8,249,582 B1 * | 8/2012 | Abou-El-Ella | | H04L 41/5054 455/412.2 |
| 8,423,012 B1 * | 4/2013 | Abou-El-Ella | | H04W 8/24 455/419 |
| 8,423,017 B2 * | 4/2013 | Haralson | | H04W 8/30 340/5.72 |
| 8,423,018 B2 * | 4/2013 | Bergqvist | | H04W 8/18 455/432.1 |
| 8,509,844 B2 * | 8/2013 | Venkataramu | | H04L 63/0853 370/320 |
| 8,744,443 B2 * | 6/2014 | Buckley | | H04W 48/18 370/328 |
| 8,837,449 B2 * | 9/2014 | Chen | | H04W 4/001 370/252 |
| 8,880,038 B2 * | 11/2014 | Bramwell | | H04W 8/04 370/401 |
| 9,008,653 B2 * | 4/2015 | Sparks | | H04W 8/183 370/338 |
| 9,049,628 B2 * | 6/2015 | Swaminathan | | H04W 48/18 |
| 9,146,936 B2 * | 9/2015 | Roka | | G06F 17/30174 |
| 9,171,243 B1 * | 10/2015 | Cordes | | G06K 19/07309 |
| 9,197,672 B2 * | 11/2015 | Dobson | | H04L 63/20 |
| 9,264,842 B1 * | 2/2016 | Sumner | | H04W 8/245 |
| 9,271,316 B2 * | 2/2016 | Bakker | | H04W 76/021 |
| 9,324,016 B1 * | 4/2016 | Cordes | | G06K 19/0727 |
| 9,351,148 B2 * | 5/2016 | Sparks | | H04W 8/183 |
| 9,414,305 B2 * | 8/2016 | Pankajakshan | | H04W 48/18 |
| 9,449,160 B1 * | 9/2016 | Czeskis | | G06F 3/167 |
| 9,454,723 B1 * | 9/2016 | Cordes | | H04B 5/0062 |
| 2004/0043788 A1 * | 3/2004 | Mittal | | H04M 3/42178 455/558 |
| 2005/0064901 A1 * | 3/2005 | Park | | H04M 1/2755 455/556.1 |
| 2007/0093202 A1 * | 4/2007 | Hwang | | H04W 48/14 455/3.06 |
| 2007/0254646 A1 * | 11/2007 | Sokondar | | H04W 8/183 455/432.1 |
| 2009/0061860 A1 * | 3/2009 | Jiang | | H04M 3/2281 455/433 |
| 2009/0082019 A1 * | 3/2009 | Marsico | | H04W 48/18 455/435.2 |
| 2009/0197621 A1 * | 8/2009 | Book | | H04M 1/575 455/457 |
| 2009/0239584 A1 * | 9/2009 | Jheng | | H04W 8/26 455/558 |
| 2010/0075669 A1 * | 3/2010 | Sparks | | H04W 8/183 455/433 |
| 2010/0105375 A1 * | 4/2010 | Schroter | | H04L 63/0853 455/419 |
| 2011/0294472 A1 * | 12/2011 | Bramwell | | H04W 8/04 455/413 |
| 2012/0188996 A1 * | 7/2012 | Roka | | G06F 17/30174 370/350 |
| 2012/0189016 A1 * | 7/2012 | Bakker | | H04W 76/021 370/401 |
| 2012/0270524 A1 * | 10/2012 | Venkataramu | | H04L 63/0853 455/411 |
| 2014/0004854 A1 * | 1/2014 | Veran | | H04W 48/18 455/432.1 |
| 2014/0071940 A1 * | 3/2014 | Swaminathan | | H04W 48/18 370/331 |
| 2014/0244351 A1 * | 8/2014 | Symons | | G06Q 30/0201 705/7.29 |
| 2015/0024739 A1 * | 1/2015 | Bramwell | | H04W 8/04 455/432.3 |
| 2015/0082374 A1 * | 3/2015 | Dobson | | H04L 63/20 726/1 |
| 2016/0205537 A1 * | 7/2016 | Schroter | | H04L 63/0853 455/419 |

\* cited by examiner

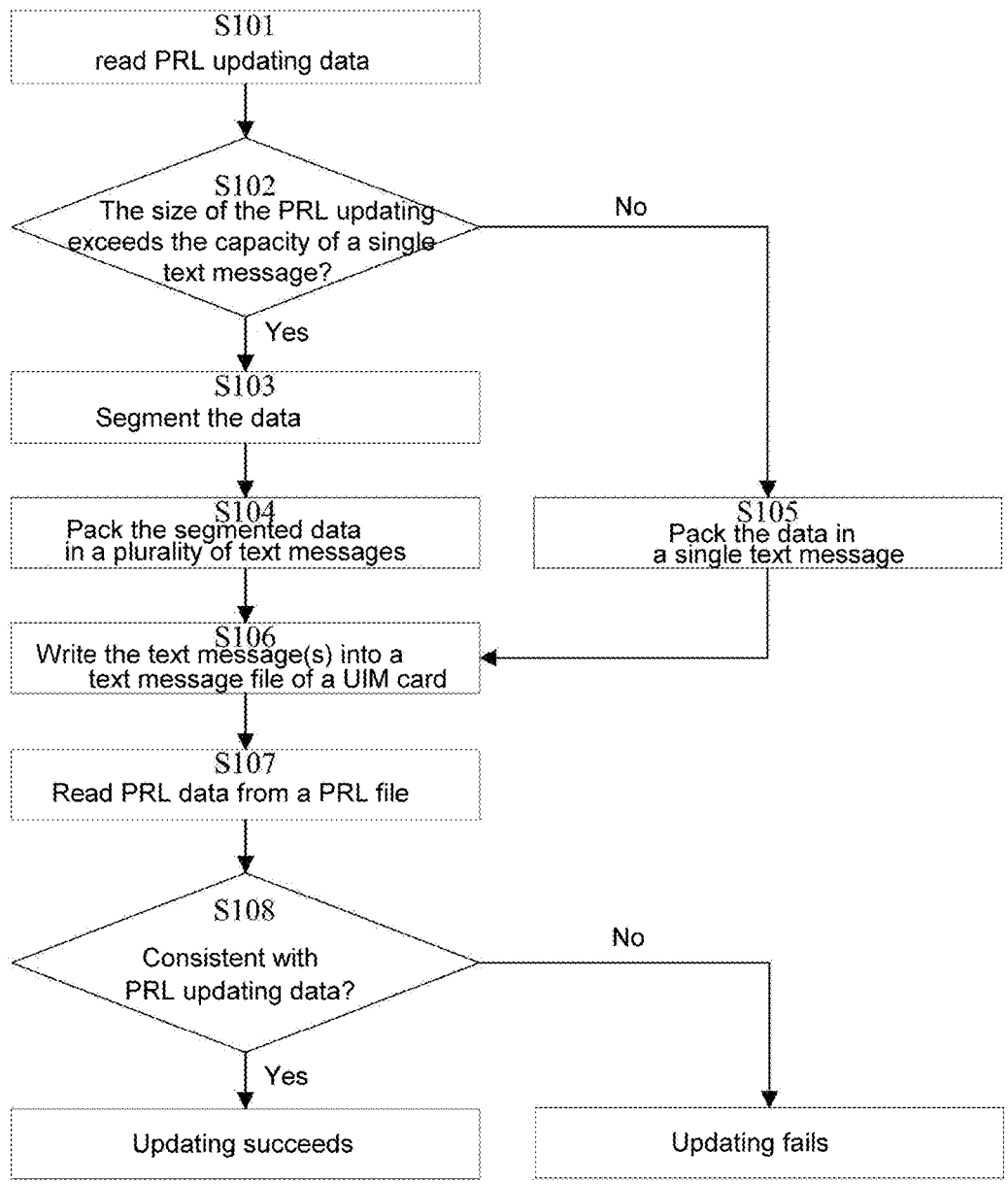

METHOD FOR UPDATING PREFERRED ROAMING LIST OF UIM CARD

TECHNICAL FIELD

The present invention relates to a method for updating a preferred roaming list (PRL) of a user identity module (UIM) card.

BACKGROUND

In a CDMA communication system, a preferred roaming list (PRL) file, which contains a list of operators in other countries signing network roaming protocols with local operators and related network parameters, is stored in a user identity module (UIM) card of a mobile communication terminal. Thus, a mobile communication terminal may achieve network roaming by using data in a PRL file.

Within a course of development of communication system, during instrument testing, especially during radio frequency testing, in most cases it is only required to set a PRL in a UIM card to make the PRL match an instrument. That is, it is required to set a PRL file according to parameters of the instrument.

Currently, there are two methods for setting a PRL file: one is to update a PRL file by receiving a PRL updating text message from a mobile operator, and the other is to write a PRL file into a special white card using an interface provided by a UIM card manufacturer.

The UIM card used in the first method must be a card activated in a live network, and cannot be a defaulting card or a discarded card. In addition, in such a way, a PRL can only be updated to the latest version of the live network rather than specified contents. Thus, this method is not applicable to instrument testing.

Although the second method is capable of specifying PRL files, there exist the following problems: firstly, white cards used are high in cost, with each white card usually costing about 100 yuan; and secondly, some UIM card manufacturers may not be willing to disclose an interface for modifying PRL files or to provide corresponding modification permissions. Thus, there is desire for a method capable of setting a PRL file in a UIM card at low cost.

SUMMARY OF THE INVENTION

Thus, in order to solve the above mentioned problems, the present invention provides a method for updating a preferred roaming list (PRL) of a user identity module (UIM) card, wherein the PRL file in the UIM card is updated by constructing a PRL updating text message.

According to one embodiment of the present invention, a method for updating a preferred roaming list (PRL) of a user identity module (UIM) card is provided, the method comprising: reading PRL updating data; packing the PRL updating data in a PRL updating text message; and writing the PRL updating text message in a text message file of the UIM card.

According to an embodiment, writing the PRL updating text message into a text message file of the UIM card may comprise: mounting the UIM card in a mobile communication terminal or a UIM card reader; and writing the PRL updating text message into the text message file of the UIM card by a computer connected to the mobile communication terminal or the UIM card reader using UIM card read and write instruction(s).

According to an embodiment, the method may further comprise: reading PRL data from a PRL file of the UIM card; and comparing the read PRL data with the PRL updating data to verify whether the updating of the PRL is successful.

According to an embodiment, reading PRL data from a PRL file of the UIM card may comprise: mounting the UIM card in the mobile communication terminal or the UIM card reader; and reading the PRL data from the PRL file of the UIM card by a computer connected to the mobile communication terminal or the UIM card reader using UIM card read and write instruction(s).

According to an embodiment, packing the PRL updating data in the PRL updating text message may comprise: if a size of the PRL updating data exceeds a capacity of a single text message, segmenting and packing the PRL updating data in a plurality of PRL updating text messages.

According to the method for updating a PRL of a UIM card in the embodiments of the present invention, a PRL updating process of a mobile operator is simulated by constructing a PRL updating text message, so that updating of the PRL may be completed using a discarded defaulting card of the present network, thus both minimizing the cost and achieving random specification for PRL data.

BRIEF DESCRIPTION OF THE DRAWINGS

FIG. 1 shows a flowchart of a method for updating a PRL of a UIM card according to an embodiment of the present invention.

DETAILED DESCRIPTION OF THE INVENTION

Exemplary embodiments according to the present invention are described in detail below with reference to the drawings. In the drawings, components essentially identical in structure and function are endowed with identical or similar reference signs, and redundant descriptions about essentially identical components are omitted for conciseness of the description.

FIG. 1 shows a flowchart of a method for updating a PRL of a UIM card according to an embodiment of the present invention.

With reference to FIG. 1, in step S101, PRL updating data is read. Here, the PRL updating data may correspond to network parameters used in instrument measurement.

In step S102, it is determined whether the size of the PRL updating data exceeds the capacity of a single text message.

If the size of the PRL updating data exceeds the capacity of a single text message, the PRL updating data is divided into a plurality of segments in step S103, and the plurality of segments are respectively packed in a plurality of PRL updating text messages in step S104.

If it is determined in step 102 that the size of the PRL updating data does not exceed the capacity of a single text message, the PRL updating data is packed in a single PRL updating text message in step S105.

According to an embodiment, step 102 to 104 can also be omitted if the size of the PRL updating data is relatively small. That is, step S105 is directly executed so as to pack the PRL updating data in a single PRL updating text message.

In step S106, the PRL updating text message is written into a text message file of a UIM card. If a plurality of PRL updating text messages are generated, they will be written in sequence. According to an embodiment, a UIM card can be mounted in a mobile communication terminal, such as a mobile phone, or a UIM card reader, and the PRL updating text message is written into a text message file of a UIM card by a computer connected to the mobile communication terminal or the UIM card reader using UIM card read and write instruction(s). At this point, the UIM card will take the written PRL updating text message as a PRL updating text message received from a mobile operator, thereby extracting the PRL updating data therefrom to update the PRL data in the PRL file. When a plurality of PRL updating text messages exist, the UIM card will execute corresponding merging operation(s) to form complete PRL updating data.

So far, the updating of a PRL file in a UIM card has been completed by simulating a PRL updating text message of a mobile operator. The above-mentioned process does not require a support from a mobile operator network, and thus it is not required to use a UIM card activated in a live network. In addition, due to the fact that the PRL is updated using an automatic updating mechanism for a PRL updating text message of a UIM without directly writing a PRL file, it is not required to purchase a special white card as mentioned in the background art section, also, it is not required to draw support from a PRL writing interface and permission from a UIM card manufacturer. Thus, PRL updating can be achieved by simply using a discarded defaulting card, thereby greatly reducing the cost.

Furthermore, the following optional operations can be executed to verify whether a PRL updating operation succeeds.

In step S107, the PRL data is read from the PRL file of the UIM card. According to an embodiment, a UIM card can be mounted in a mobile communication terminal or a UIM card reader, and the PRL data can be read from the PRL file of the UIM card by a computer connected to the mobile communication terminal or the UIM card reader using UIM card read and write instruction(s).

In step S108, the read PRL data is compared with the PRL updating data, and if the PRL data is consistent with the PRL updating data, the updating succeeds; otherwise, the PRL updating fails.

Features of many embodiments are described above to enable those having common knowledge in the art to clearly understand the aspects of the description. Those having common knowledge in the art could understand that they can fulfil the same purposes as those of the above-mentioned embodiments and/or achieve the same advantages as those of the above-mentioned embodiments by designing or modifying other processes and structures on the basis of the contents disclosed in the present invention. Those having common knowledge in the art could also understand that any alteration, replacement and modification can be made, without departing from the spirit and scope of the present invention, by an equivalent construction which does not depart from the spirit and scope of the present invention, on the features of many embodiments described above, thereby enabling those having common knowledge in the art to clearly understand aspects of the description. Those having common knowledge in the art could understand that they can fulfil the same purposes as those of the above-mentioned embodiments and/or achieve the same advantages as those of the above-mentioned embodiments by designing or modifying other processes and structures on the basis of the contents disclosed in the present invention. Those having common knowledge in the art could also understand that any alteration, replacement and modification can be made, without departing from the spirit and scope of the present invention, by an equivalent construction which does not depart from the spirit and scope of the present invention.

The invention claimed is:

1. A method for updating a preferred roaming list of a user identity module card, the method comprising:
    reading preferred roaming list updating data;
    packing the preferred roaming list updating data in a simualated preferred roaming list updating text message of a mobile operator; and
    writing the simulated preferred roaming list updating text message into a text message file of the user identity module card.

2. The method of claim 1, wherein writing the simulated preferred roaming list updating text message into the text message file of the user identity module card comprises:
    mounting the user identity module card in a mobile communication terminal or a user identity module card reader; and
    writing the simulated preferred roaming list updating text message into the text message file of the user identity module card by a computer connected to the mobile communication terminal or the user identity module card reader using user identity module card read and write instruction.

3. The method of claim 1, wherein reading the preferred roaming list data from a preferred roaming list file of the user identity module card comprises:
    mounting the user identity module card in a mobile communication terminal or a user identity module card reader; and
    reading the preferred roaming list data from the preferred roaming list file of the user identity module card by a computer connected to the mobile communication terminal or the user identity module card reader using user identity module card read and write instruction.

4. The method of claim 1
    wherein packing the preferred roaming list updating data in a simulated preferred roaming list updating text message comprises,
    if a size of the preferred roaming list updating data exceeds a capacity of a single text message, segmenting and packing the preferred roaming list updating data in a plurality of simulated preferred roaming list updating text messages.

5. The method of claim 1, further comprising:
    reading the preferred roaming list data from a preferred roaming list file of the user identity module card; and
    comparing the read preferred roaming list data with the preferred roaming list updating data to verify whether the updating of the preferred roaming list is successful.

* * * * *